US011517983B2

(12) United States Patent
Tyson, II

(10) Patent No.: US 11,517,983 B2
(45) Date of Patent: Dec. 6, 2022

(54) METHODS, SYSTEM AND DEVICES FOR PANEL MARKING AND FORMABILITY MEASUREMENTS, INCLUDING AUTONOMOUS METHODS AND DEVICES

(71) Applicant: John Tyson, II, Wayne, PA (US)

(72) Inventor: John Tyson, II, Wayne, PA (US)

(*) Notice: Subject to any disclaimer, the term of this patent is extended or adjusted under 35 U.S.C. 154(b) by 0 days.

(21) Appl. No.: 17/634,935

(22) PCT Filed: Aug. 24, 2020

(86) PCT No.: PCT/US2020/047565
§ 371 (c)(1),
(2) Date: Feb. 11, 2022

(87) PCT Pub. No.: WO2021/041281
PCT Pub. Date: Mar. 4, 2021

(65) Prior Publication Data
US 2022/0274206 A1 Sep. 1, 2022

Related U.S. Application Data

(60) Provisional application No. 62/891,220, filed on Aug. 23, 2019.

(51) Int. Cl.
*B23K 26/362* (2014.01)
*G01L 1/24* (2006.01)
(Continued)

(52) U.S. Cl.
CPC .......... *B23K 26/362* (2013.01); *B41M 5/24* (2013.01); *G01L 1/24* (2013.01); *B23K 26/0884* (2013.01); *B23K 26/16* (2013.01)

(58) Field of Classification Search
CPC .. B23K 26/362; B23K 26/0884; B23K 26/16; B41M 5/24; G01L 1/24
(Continued)

(56) References Cited

U.S. PATENT DOCUMENTS 4,028,523 A 6/1977 Anderl et al.
4,212,317 A * 7/1980 Patrick ...................... H01J 9/00
414/217
(Continued)

FOREIGN PATENT DOCUMENTS

EP 2471625 A2 7/2012

OTHER PUBLICATIONS

Fahrettin Ozturk, Murat Dilmec, Mevlut Turkoz, Remzi E. Ece, Huseyin S. Halkaci, "Grid Marking and Measurement Methods for Sheet Metal Formability", 5th International Conference and Exhibition on Design and Production of Machines and Dies/Molds, Jun. 18-21, 2009 Pine Bay Hotel—Kusadasi, Aydin, Turkey.
(Continued)

*Primary Examiner* — Dana Ross
*Assistant Examiner* — Joseph W Iskra
(74) *Attorney, Agent, or Firm* — Bonini IP Law, LLC; Frank J. Bonini, Jr.

(57) ABSTRACT

A method, system and devices for autonomous marking of a substrate and for conducting formability measurements. The method, system and devices may be used to apply markings to a substrate, such as panels that are used to construct articles. The panels, for example, may be automobile panels. The markings preferably are applied on the panel autonomously with a laser etching, and with robot device that is controlled to form a precise pattern of indicia (e.g., dots), on the panel surface. An x, y, z, gantry coordinate system may be used to guide the operations of the robot device to position the device for etching at precise locations on the substrate surface. Once etched, the panels may be processed, such as, by stamping or cutting, and the deformation of the dot pattern may be used to determine strain and formability properties.

24 Claims, 8 Drawing Sheets

Pattern Example

(51) Int. Cl.
*B41M 5/24* (2006.01)
*B23K 26/08* (2014.01)
*B23K 26/16* (2006.01)

(58) Field of Classification Search
USPC .................................................. 219/121.85
See application file for complete search history.

(56) References Cited

U.S. PATENT DOCUMENTS

| | | | |
|---|---|---|---|
| 4,769,257 A | 9/1988 | Duley et al. | |
| 2007/0109170 A1 | 5/2007 | Costin et al. | |
| 2008/0099433 A1* | 5/2008 | Huang | B41C 1/05 216/54 |
| 2009/0056403 A1* | 3/2009 | Chanko | B23K 31/02 72/324 |
| 2010/0272961 A1* | 10/2010 | Costin, Jr. | B23K 26/082 428/156 |
| 2014/0263674 A1* | 9/2014 | Cerveny | G06K 19/06037 235/494 |
| 2016/0154926 A1 | 6/2016 | Szigeti | |
| 2016/0202689 A1 | 7/2016 | Szarski et al. | |

OTHER PUBLICATIONS

Jovan Jovicic, "Argus Formability Solution", https://www.researchgate.net/publication/325907960, Jun. 2018.

John P. Barranger, Two-Dimensional Surface Strain Measurement Based on a Measurement of Yamaguchi's Laser-Speckle Strain Guage, NASA Technical Memorandum 103162, Prepared for the Conference on Optical Testing and Metrology III, San Diego, CA, Jul. 8-13, 1990.

Dr. R. Uday Kumar, "Analysis of Major Strains and Minor Strains in Sheet Metal Forming", International Journal of Application or Innovation in Engineering & Management (IJAIEM), vol. 2, Issue 2, Feb. 2013, pp. 194-198.

Dr. N.S. Mahesh, "Sheet Metal Forming Technology", M.S Ramaiah School of Advanced Studies—Bangalore.

Richard Gedney, Admet Inc., Norwood, Massachusetts, "Sheet Metal Formability", Advanced Materials & Processes, Aug. 2002.

"Strain Transformation and Rosette Gage Theory", AE3145 Strain Transformation and Rosette Gage Theory, pp. 1 to 7, http://users.tamuk.edu/kfldp00/MEIE_Peel_website/Courses/Meen5330/strain-gage-rosette-theory_GA_Tech.pdf.

Tzuyang Yu et al., "Structural Health Monitoring of Bridge Abutments using Imaging Radar and Digital Image Correlation," Collection of SHM Case Studies by ASCE SEI Methods of Monitoring Committee, Feb. 12, 2016.

Wontae Kim, Ranjit Shrestha, and Manyong Choi, "Defect detection with thermal imaging and phase shifting methods in lock-in thermography", 10.21611/qirt.2016.057, Department of Mechanical & Automotive Engineering, Kongju National University, Cheonan, Republic of Korea, pp. 391-396, 13th International Conference on Quantitative Infrared Thermography, July 4-8, 2016, Gdańsk, Poland.

* cited by examiner

Pattern Example

Laser Etching Robot

Laser Etching Robot

Mobile Laser Etching System in operation on existing inspection table.

METHODS, SYSTEM AND DEVICES FOR PANEL MARKING AND FORMABILITY MEASUREMENTS, INCLUDING AUTONOMOUS METHODS AND DEVICES

BACKGROUND OF THE INVENTION

1. Field of the Invention

The present invention relates to formability measurements, and more particularly to a system, methods and devices for carrying out precision and autonomous marking of panels, and conducting formability analyses.

2. Background of the Invention

A number of products are manufactured according to tolerances. In many instances, the product construction is comprised of panels which are formed during the production process. The formed panels may be further manipulated and assembled to fabricate a structure or article. An example of an industry that utilizes formed panels is the automobile industry. Typically, automobile panels are formed and tested before assembly line production is implemented. Testing may involve a number of properties, including formability, which is the ability of a given metal workpiece to undergo plastic deformation without being damaged. Testing may involve typical loads, or greater loads, that the product or part is expected to experience when assembled and in use. The deformation capacity of a material, for example, is limited, and thus may fracture or separate when certain load limits are reached. This is increasingly the case with the thinner, lighter materials being used by the automotive, aerospace and appliance industries. Testing also may occur during production, for example, where a problem area or situation is detected, or even after operation, where failures or problems arise, and other parts may be recalled for testing.

In a number of industries, including, for example, the automobile production industry, panels may be fabricated from steel or aluminum, which is done by stamping a metal sheet, such as, a sheet of aluminum or steel, into a form that corresponds to the panel or part (or a portion of the part that may be further manipulated, e.g., by separating, bending, drilling, and the like).

It is often a requirement and important to measure plastic deformation of a product or component parts used to construct the product to determine whether the material has been produced in an appropriate way, as well as whether the design is suitable to hold up for the purpose and uses for which it is intended. Formability testing may be carried out for metal articles and parts, such as metal panels that are used for automobile panels, beverage cans, domestic appliance stampings, and other products and product components. Formability often is governed by the material being used, as well as the thickness of the material and the manner in which the material has been formed. Strain is a particular measure of formability, and may be represented by the following formula, $\sigma = K\varepsilon^n$, where $\sigma$ is the true stress (the applied stress on the material), where $K$ is the strength coefficient, $\varepsilon$ is the strain, and $n$ is the strain hardening coefficient (an exponent between zero and 1, which for metals typically lies between 0.10 and 0.50). A high value of n is desired if good stretch formability is to be attained, as an n value of zero represents something solid, and an n value of 1 would be an elastic solid.

It has been important to determine plastic deformation for a product or product part. One example of a measurement has been to utilize a circle grid analysis. This is carried out by etching a circle grid onto the surface of a sheet of metal. Upon plastic deformation during the processing operation, such as for example, a stamping operation, the circles will deform and form ellipses. The amount of strain may be observed at each circle by noting the amount of change from a perfect circle. Where a circle maintains its original form, there would be no detectable strain at that location. However, where the circle is deformed there is strain that may be determined based on the major and minor diameters of the formed ellipses. The information obtained by the strain data from the deformed circles may be used to determine the major and minor strain (maximum and minimum of the ellipse) and relate these strains to the forming limit diagram of the specific material strength. For example, a car door typically is produced from a panel that is shaped by stretch forming during a stamping process. The major and minor strains are calculated at different locations or points across the panel surface. In a typical operation, the sheet metal used to form the door panel is etched with a pattern, which is typically a grid of circles. An electro-chemical etching process is used to produce the circle pattern on the metal surface. The panel surface is first cleaned so that is will receive the electro-chemical etch. Once cleaned, a screen, like a silk screen of circles, is applied to the sheet metal surface and covered with a specific electrolyte liquid. The operator then rolls a high-voltage roller over the screen to create the desired circle or dot pattern. The operator then moves to the next area and repeats the process, over and over again, until the entire sheet is covered with circles or dots, many times taking hours with these caustic chemicals. In the automotive industry, caustic acids have been used to etch the metal surface, which is then followed by other chemicals that clean the surface (e.g., toluene, trichloroethylene, etc.). The etchants and cleaners must be handled with caution, and many of these chemicals, particularly the acid etchants, must be handled, stored and inventoried pursuant to particular governmental regulations. The chemicals are hazardous, and in many instances workers that carry out the etching processes may be exposed to the vapors and the danger of coming into contact with the acids and cleaners. The etching procedures must be carried out for each panel that is to have the circle or dot pattern applied to it. Often, it is time consuming for the pattern to be applied, as there is not only the application of the chemicals, but the time required for the electro-chemical reactions to take place.

The accuracy of manual method of chemical etching is highly operator skill dependent, and often bad etching leads to extended manufacturing delays and scrapped parts and material, and bad information about the quality of manufactured parts.

A need exists for an improved method and system that may be used to carry out strain measurements without the need for caustic chemicals, and that can provide more expedient and reliable information.

SUMMARY OF THE INVENTION

A method, system and devices for laser etching a sheet metal part for the purpose of strain measurement. According to preferred embodiments, the method, system and devices may implement autonomous marking of a substrate. Strain and formability measurements may be conducted. The method, system and devices may be implemented to mark panels that are used to construct articles, such as, for example, automobile panels. The markings preferably may be applied on the panel autonomously.

According to embodiments, the method system and devices are used to provide laser etching of indicia, such as a pattern (e.g., dots or other measurable shapes) on a metal or plastic substrate surface from which strain measurements may be determined, where a laser is used to apply the pattern. According to some implementations, a laser head is manually guided or directed over the substrate surface. According to some preferred embodiments, the laser etching system, devices and methods provide autonomous marking of laser etching onto the substrate.

According to some embodiments, the pattern may include one or more codes, such as a QR code that is etched onto the substrate.

According to some preferred implementations, the method, system and devices may utilize codes, such as 2D QR codes, and the codes may be applied using the laser etching methods that are used for applying the indicia, such as a pattern on the substrate surface. The indicia, including patterns and codes may be applied together by the laser etching device, either through manual operation of the etching device or robotically or autonomously.

Embodiments of the method system and devices laser etch onto the surface of a structure information that may serve as an orientation and position indicator, as well as a part repository of part specific information, for use with subsequent imaging and deformation measurement determinations. According to preferred embodiments, a QR code utilized in the present method and system may provide the component information as well as serve as position and orientation designators. This may be used for alignment of prior and subsequent images, as well as for conducting the imaging, and identifying a location at which the image is being obtained. According to preferred embodiments, the QR code may store substantial information, like part no., serial no., location, and other details. Embodiments of the present method and system also utilize QR codes that are laser etched and may be utilized as or in conjunction with other patterns or pattern portions to conduct digital image correlation (DIC) for deformation measurements. In some implementations, the code, such as a QR code, for example, may be included as part of an etched pattern. According to some implementations, the use of the QR code as a local random pattern for which deformation measurements may be ascertained, may be applied to the structure surface in a manner and in locations that does not block the surface measurements. The QR code also may be used to determine surface measurements, including deformation determinations, determining whether the QR code has undergone a change from its original location or position.

According to preferred embodiments, laser etching is carried out to apply one or more QR codes onto a surface of the structure or asset to be monitored or evaluated, by etching with the laser. Preferably, the laser also is used to apply the one or more QR codes on the surface along with a pattern, such as for example a random dot pattern.

The laser applied QR code may be imaged to identify a position on the part, the part number, serial number, age, location (and/or other information), and provide a reference for the other indicia of the pattern (the dots of the random dot pattern).

The QR code may provide a location such as a start point at which the identification of the location for determining correlations between the laser pattern before and after the substrate is subjected to a stress or condition for which the substrate is being monitored.

Preferably, the codes, such as a QR code, or circular code, or numerical code or combinations of these codes are applied to the surface of a structure along with the pattern, such as, for example, a random dot pattern, so that the structure is marked with codes and a pattern. The QR code may correspond with a repair to a structure, where the repaired area receives etching of a pattern, and a QR code that identifies core data, such as the date of repair.

For example, the code may comprise a coded target, which may comprise a QR code or other 2-dimensional code that may be applied as part of or along with the pattern. The coded targets may be aligned to provide a spatial alignment of prior images, including historical images. The pattern may be observed in connection with one or more prior patterns. The code may include a QR code, which provides information as to the position of the imaged part or substrate, and the code also may provide information about the part itself. For example, a scan of an imaged structure may identify the structure based on the QR code scan. The system then may immediately proceed to call up the information for the structure from a library and/or database for the structure, and identify the particular structure.

For example, if a robot is to image a part, for example, such as a panel of an automobile, the robot or other imaging apparatus may image and scan the panel until it identifies a QR code that indicates that it is imaging the designated part and that it is imaging a location of the panel. A robot or other imaging apparatus may image one or more other QR codes, as directed, if needed, to identify the location of the panel to be imaged. This has utility for identifying a location and position on the panel, as well as when the panel is assembled in a structure (with one or more other components). The laser etching methods, system and devices may be used in conjunction with substrates, such as metal panels or structures that are to undergo processes such as welding, where the structure is exposed to high temperatures. The laser etching may be pre-applied to the structure or component of the structure (such as a panel used to form the structure). The laser etched pattern, as well as codes, such as QR codes, remain on the panel during subsequent assembly, such as welding. The laser etching provides a way to allow deformation analyses to be carried out even where a structure is assembled by welding or other high temperature process.

According to some implementations, the code or codes, such as a QR code, also may be used to spatially synchronize a CAD and CRI for the part or substrate.

An embedded code, such as a QR code or other code, may be etched onto the substrate using the laser for local orientation and alignment with previous measurements. The QR code may also contain information about the structure (such as the automobile panel) and also may be used to provide an alignment point for the visual alignment of a camera or optical measuring device that aligns the location of the structure, such as the panel, on which the laser etched pattern or indicia has been applied (along with the with the QR code and another point, or other code) to determine the positions of the points or shapes forming the patterns, and the movement or changes in position when conducting subsequent DIC measurements for deformation and strain.

According to preferred embodiments, a QR code (or multiple QR codes) may be applied as part of the pattern, and the QR code may be programmed to be applied as part of the laser etching of the pattern (e.g., dots or other pattern) or other indicia, to the surface of a substrate. For example, laser etching may be applied to an automobile panel surface to apply a pattern, and one or more QR codes. The QR code may be applied in a specified location, or may be provided in a location where the laser etched pattern or indicia also being applied will not be disrupted by the presence of the QR code. The QR code may serve as an alignment mechanism to provide the location on the surface structure, or for use in identifying a camera location relative to the structure or a location on the structure. The QR code additionally or alternatively may include a designation or link to information about the structure, or may contain coded information about the structure, or a particular element or item of the structure or other characteristic or property.

According to an alternate embodiment, a manual method may have a hood with laser safety features to prevent the operator from access to the laser energy to a safe level, for both eye and skin. A preferred method may be implemented with a system comprising a laser mounted hood with vacuum interlock integral to its Teflon outer rim.

According to a preferred embodiment and implementation, a manual laser etching system may be used, which preferably includes a hood that captures gasses and particulates from the laser etching process. The laser is situated within the hood and a vacuum line, preferably with a filter, is connected to the hood to draw off gasses and particulates from the enclosed area within the hood where the laser etching takes place.

Preferred embodiments of the laser etching systems include an air filtration system to collect laser etching gases and particulates, and pass them through a HEPA filter, vent or similar removal method.

According to some preferred embodiments, a robot is provided for traversing the panel area and applying the markings. The robot is fitted with a laser that is controlled by a control mechanism to generate an output from the laser head to etch desired areas on the surface of the sheet. The control mechanism preferably is programmed to produce a grid or pattern on the substrate surface. For example, according to preferred embodiments, the laser produces a grid or pattern of circles (which may be dots), on the metal surface.

The applied pattern of markings, such as the dot pattern, preferably is accurate, and the pattern is marked within a suitable tolerance so that the etched dots or pattern may be used to carry out accurate formability measurements. According to preferred embodiments, the laser is calibrated. Calibration of the laser preferably may be carried out using a photogrammetry system that images all of the three dimensional points of the structure, such as in connection with an imaging unit or cameras, and software (e.g., ARGUS, GOM GmbH, Braunschweig, Germany). In order to carry out the laser calibration, the laser etches the desired pattern (i.e., the dots) for the measurement (the measurement being obtained using the software, such as the ARGUS software, and an imaging system, e.g., one or more cameras). According to preferred implementations, prior to forming (no stress), the laser etched dots are measured with the ARGUS software (and using a computer on which it operates). In this measurement prior to forming (no stress), measuring the error in the dots takes place. This measurement, e.g., a pre-forming dot measurement or calibration measurement, is then used to calibrate the laser to etch the dots more accurately.

According to some preferred embodiments, the method involves operating an autonomous device, such as a robot, to etch a pattern onto the substrate surface (such as a metal surface). The robot is operated to control the location of the pattern images (e.g., the dots), and to control the laser to produce the etched pattern in the desired locations on the substrate surface. According to some implementations, the pattern may be provided over the entire surface of the substrate, while according to other implementations, the pattern is applied to a select area or areas of the substrate (e.g., such as, for example, a problem area that is being investigated).

Once the dot pattern is applied, formability measurements may be carried out. These formability measurements may be carried out with an ARGUS photogrammetry system (Gom GmbH, Braunschweig, Germany). The panel may be subjected to forces or loads. One example, is that the panel, now having the surface of dots on it, may be processed to form a part. For example, in the case of an automobile production application, a sheet of metal that has been etched by the robot with a pattern of dots, may be stamped to produce a door panel. The panel with the pattern thereon may be processed or finished with other assembled parts and tested by applying a force load, such as, for example, where a handle area aperture is fitted with a handle, and undergoes tests, or a door closing operation is carried out on an assembled or partially assembled door. According to a preferred implementation, the stress from the forming process is what is being evaluated, such as, for example, in connection with the forming of a door handle area of a door panel. The door handle area typically is overly formed and also undergoes high fatigue stresses during operation, so it is a critical area to confirm proper forming. According to one example, the present, method, system and devices may be used to conduct laser etching of a door panel, and measure the stress from the forming process.

The strain may be determined by implementing a computer software analysis program that takes into account the dot pattern, and the resultant deformation of the pattern. Strain may be determined using a photogrammetry system and software that measures the resultant dot pattern and calculates the local strains across the panel. This data can then be plotted on a forming limit diagram to confirm that the material is formed within its material's strength. This data can then be compared to the design's finite element model to confirm proper straining of the material. Error can occur from many areas including bad design, wrong material used, bad press settings, etc. One example of a commercially available photogrammetry system is ARGUS (Gom, GmbH, Braunschweig, Germany) which includes software that processes the pattern information to calculate the deformation and strain profiles and data. A comparison of the resultant dot pattern and deformation areas after the load or test with the original applied pattern is made. According to preferred embodiments, the applied etching may be of a known pattern, which needs to be precise, and after forming, the pattern is imaged to determine the strain, and whether it falls within suitable tolerances. According to some applications, for example, forming may, many times, be a multistep process, with a plurality, e.g., 3-5, stampings after each other to achieve the final result. The measurements, such as for example, with the software (e.g., ARGUS photogrammetry system), may be used many times at each step to confirm proper forming at each step, and for locating which step may be causing a problem.

According to some alternate embodiments, e.g., where high-precision applications are involved, imaging of the original dot pattern, prior to a first forming step, may be carried out.

This initial imaging becomes the baseline for the article. After manipulation of the article, through testing, stamping, or other applied force loading, the article is imaged and the dot pattern is compared with the original dot pattern. Discrepancies of the dots and pattern indicate deformation. The software generates data and reports based on the deformity observed from the images. The robotically autonomously applied dot pattern, provides the baseline for the measurement, and from that baseline determinations are made to provide information about the strain. According to alternate embodiments and implementations, the baseline may be obtained by manually operating the device.

The application of the dot pattern using the inventive devices and methods, preferably with the implementation of the calibration feedback to get the desired accuracy, produces an accurate arrangement of the dots placed on the material surface. The pattern applied has the proper contrast and is material independent, and does not require the use of chemicals. The present methods, system and devices for autonomous laser etching provide accurately marked panels, automatically, and may be used with ARGUS formability measuring software applications. The present methods, system and devices, provide enhanced safety for personnel and the environment, and reduce labor requirements and training as the personnel no longer are required to train and use controlled chemicals.

The device preferably is configured as a robot that has a laser head that is controllably positionable and controllable to deliver a laser pulse to a particular area of a panel to generate indicia thereon. Preferably, the indicia is generated in the form of a pattern, such as, for example a dot pattern over the surface of the panel (or surface portion thereof). According to preferred embodiments, the device is operably driven through an x, y, z gantry system to automatically move the device head to the areas of interest of the panel, or across the areas where the pattern is to be applied, and includes edge detection (of the panel edge), and known location across the entire panel (e.g., a large flat panel).

The system, methods and devices also may store information about a particular panel or pattern to be applied, so that once the first set of programming is done for each panel, repeatability may be accomplished by utilizing the prior stored information. According to preferred embodiments, the system, method and devices may import and store specific CAD and FEA computer models, and information about critical areas of concern with specific designs. One or more profiles may be stored and maintained for particular applications, such as for example, a particular model or a particular substrate, such as a door panel for a specific vehicle model.

The system, method and devices save man-hours over the prior chemical etching processes, improve operator safety by eliminating the risks associated with long-term exposure to etchant chemicals, and provide higher precision patterning for greater formability measurement accuracy. In addition, the present method, system and devices conserve resources by saving panels (as well as time and costs) by eliminating or minimizing waste of panels that would have to be scrapped, due to etching processes being incomplete, or image shifting, or other processing detriments. The present invention provides the capabilities for operators to carry out the autonomous etching procedure while multi-tasking to perform other duties at the same time, as the device may carry out the etching without the need for the operator to be involved in every step.

The methods, system and devices provide improvements over the prior methods. For example, in the case of pre-lubed metals, such as where pre-lubed metal panels are supplied for fabrication (e.g., such as for use in the construction of a vehicle), the prior chemical electro-etching removes all of the pre-lube to etch the part. The present laser etching system, methods and devices utilize the laser and laser robots to conduct laser etching. The laser etching of the present system, method and devices burns through the pre-lube and only etches the specific dot, allowing the etched part to properly model the rest of the lot.

These and other advantages of the invention may be realized by the present method, system and devices.

BRIEF DESCRIPTION OF THE DRAWING FIGURES

DETAILED DESCRIPTION OF THE PREFERRED EMBODIMENTS

Figure 1:
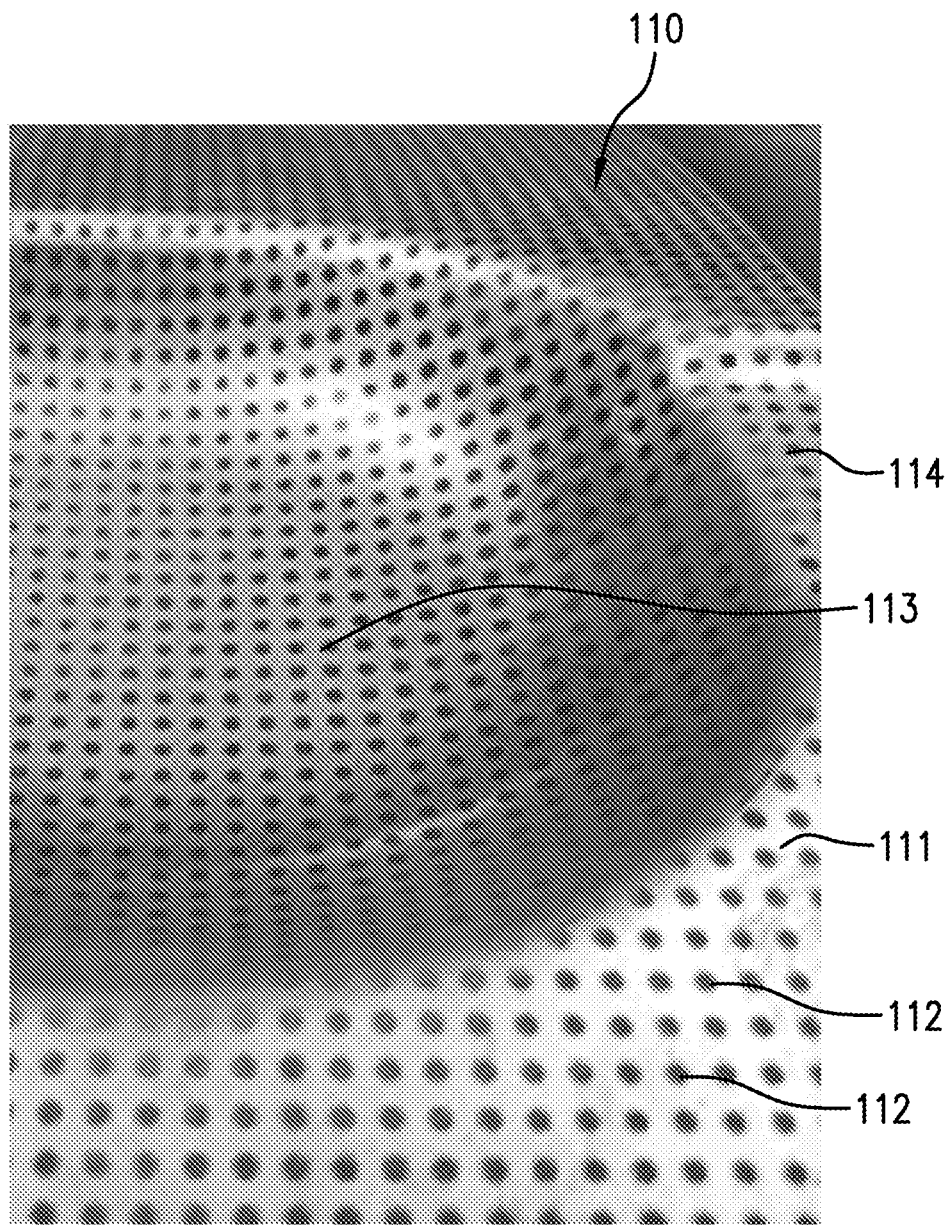
FIG. 1 is a perspective view of a metal substrate depicting an exemplary illustration of a pattern that has been applied to the surface thereof using the methods, devices and system.

Referring to FIG. 1, a substrate 110 is depicted to illustrate an article to which a pattern 111 has been applied in order to conduct formability measurements. The substrate 110, in the embodiment depicted, is shown comprising a sheet of metal which has a pattern 111 of laser etched circles or dots 112 on the panel surface 110a. The laser etched pattern 111 preferably is applied on the panel in its flat condition. As is illustrated, the panel 110 includes a first deformation 113 appearing as a bowl-like shape and an adjacent second deformation 114, at a level not as deep as the first deformation 113. The deformations 113, 114 are depressions in the substrate 110, and preferably are formed by a suitable process, such as, a stamping process. The stamped substrate 110 forms the article depicted in FIG. 1. The article, which is a panel 110, may be used to form an assembled product, such as, for example, a vehicle or other item. Upon formation, the manipulation of the material (e.g., the metal substrate sheet), may bend, stretch and/or elongate in one or more directions. The laser etched dot pattern 111 exhibits the formability by correspondingly deforming with the material 110. The deformation of the dot pattern 111 based on the movement and positioning of the individual dots 112 may be evaluated to determine the strain measurement.

Figure 2:
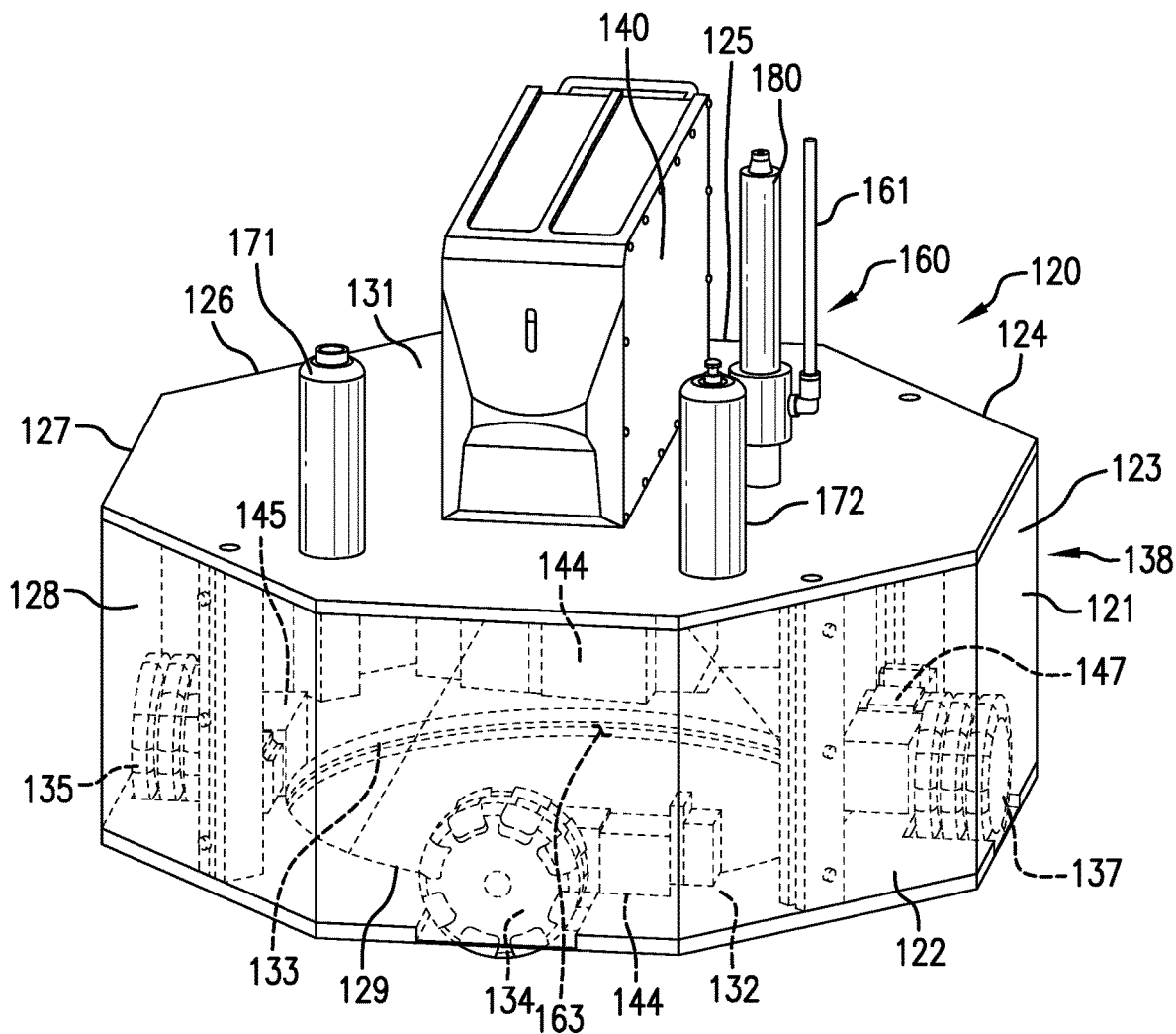
FIG. 2 is a perspective view of a first exemplary embodiment of a device configured as a robot, for producing a laser etched pattern on a substrate.
Figure 3:
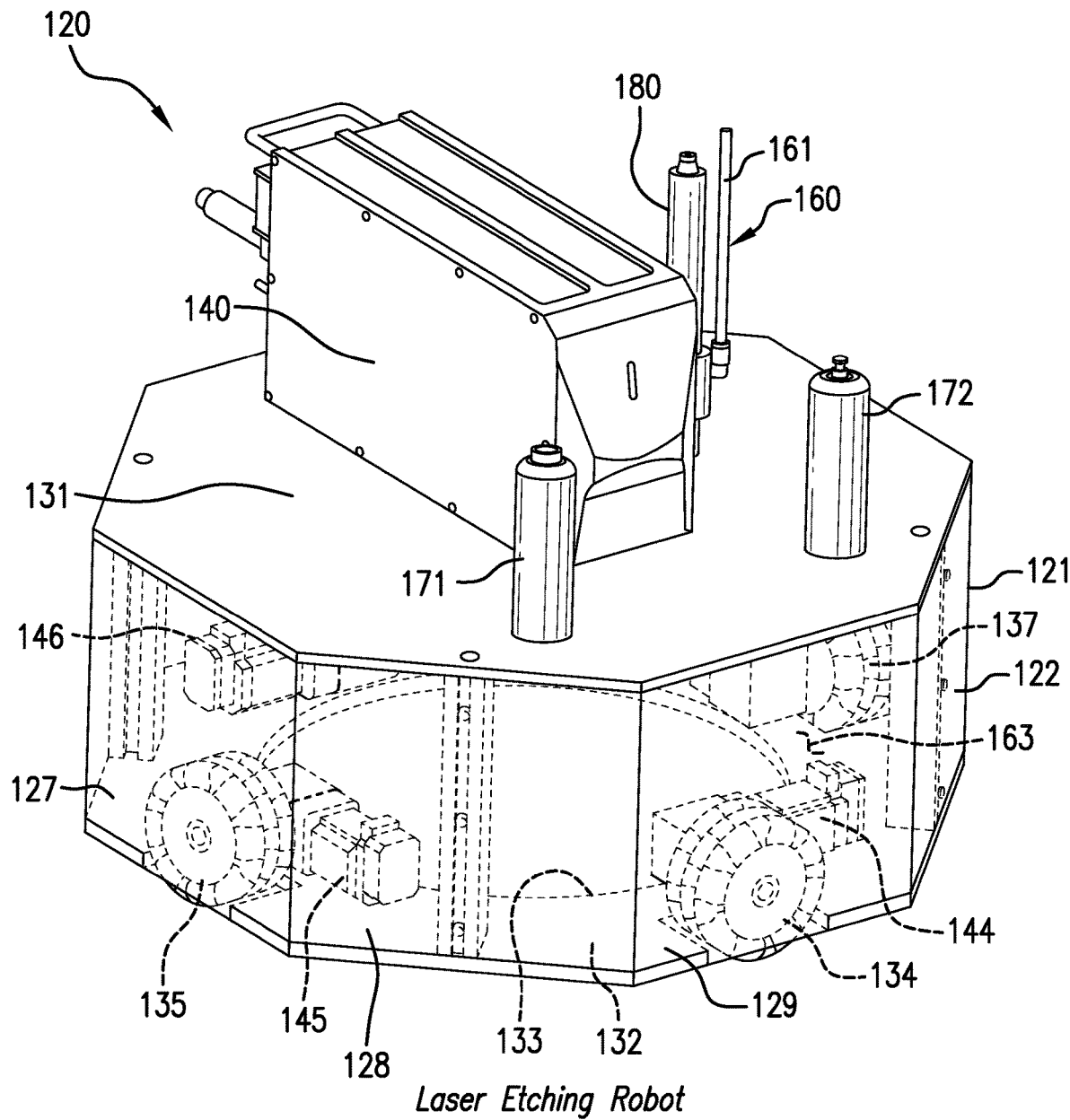
FIG. 3 is an alternate perspective view of the device of FIG. 2.

According to preferred embodiments, an autonomous robot is programmed to produce a pattern on a substrate, such as, for example a sheet of metal. As illustrated in FIGS. 2 and 3, an exemplary illustration of a laser etching robot 120 is shown having a housing 121, which includes a plurality of side walls 122, 123, 124, 125, 126, 127, 128, 129, an upper wall 131 and lower wall 132. The walls of the device 120, which in the illustrated embodiment include the upper wall 131, side walls 122, 123, 124, 125, 126, 127, 128, 129, and lower wall 132, preferably comprise shielding walls, in accordance with the laser use, which preferably comprises a Class IV laser. The lower wall 132 includes an opening 133 therein, and preferably comprises a shield (to shield surrounding areas) with the opening 133 for the laser output to pass. The housing 121, and walls comprising it, preferably is constructed to meet or exceed safety requirements for a Class IV laser. A laser head 140 is shown situated at the upper wall 131 of the housing 121. The robot device 120 is configured having means for moving the robot 120 to a desire position. According to a preferred embodiment the means for moving the robot is shown comprising a plurality of wheels 134, 135, 136, 137, which may be operably controlled to drive the robot 120 and precisely position the robot 120 at a location on a substrate for delivery of the etching indicia at precise locations on the substrate surface. According to a preferred embodiment, a motor 144, 145, 146, 147 is associated with each wheel 134, 135, 136, 137, and is independently controllable to drive each respective wheel in a clockwise or counterclockwise rotation. Suitable drive mechanisms, such as, for example, an axle, gearing, cables or the like, may connect a motor shaft with a respective wheel. As illustrated, each wheel 134, 135, 136, 137 may be driven in a clockwise or counterclockwise direction, as needed to move or situate the robot 120 in the desired position. The wheels 134, 135, 136, 137 are configured to position the robot 120 over an x, y, z, gantry coordinate system, where the laser of the laser head 140 may be positioned to deliver its output to a precise location. Preferably the wheels 134, 135, 136, 137 are omnidirectional wheels, and the motors are multi-axis drive motors. The wheels 134, 135, 136, 137 and motor arrangement allow for precise movement of the robot 120 along the substrate.

The laser head 140 preferably includes a laser that is controllable in pulse duration, energy, and beam. The laser head 140 may be removable or interchangeable to provide for situations where a different type of laser is called for (e.g., for a particular substrate type or substrate composition). The beam preferably is concentrated to etch the surface of the substrate by effecting the surface location receiving the laser output. Preferably, the etching of the surface with the laser is carried out to effect discoloring or ablating of the surface portions of the substrate to leave the indicia of the discolored or ablated shape (such as, for example, a dot). The device 120 is moved along the substrate, or over one or more designated areas of interest, to produce the desired pattern.

The wheels preferably are controlled by individual motors that are operated to drive the respectively associated wheel in the respective direction to position the device 120 in a location to produce the indicia. Once indicia, such as, for example, a set of dots, has been etched at one location, the device 120 moves to a next location where the device 120 etches another indicia, e.g., a dot, or pattern of dots. Although a dot is mentioned, the laser head 140 of the device 120 may be configured to produce a plurality of indicia, such as dots, while the laser device 120 is in one location on the substrate. The device 120 continues to move from position to position across the substrate or substrate area, producing the indicia and forming the pattern. According to some preferred embodiments and implementations, the device movement, etching and formation of the pattern is autonomous, with precision locationing and etch detection and alignment. Once the device 120 is located, either by being placed on a location of the substrate, or by a locating program that locates the device 120, the device 120 may then move along the substrate or substrate area (see e.g., the substrate 110), and produce the pattern. For example, a program of spaced apart dots in a pattern, such as the pattern 111 shown in FIG. 1, may be input, and the device 120 moves along the substrate surface 110a to etch the pattern 111 on the surface.

The device 120 also includes an evacuation mechanism that is shown comprising a fume extraction system 160. The fume extraction system 160 includes a tube 161 which communicates with the device interior space 163 enclosed by the housing 120. The tube 161 preferably may be connected to a line, such as the exhaust line 164 (FIG. 4), and a component, such as, for example, a fan, pump or other suitable mechanism (not shown), which may also include an air filter, like a HEPA filter (or may be evacuated to facility air handling system).

The fan, pump or mechanism, which according to preferred embodiments, may be external to the device 120, may pull a vacuum or provide a pressure differential to extract the fumes from the etching area (i.e., from within the housing 121) via the tube 161 and the exhaust line 214. The housing 121 preferably comprises an enclosure, which may be formed by one or more side walls (such as the side walls 122, 123, 124, 125, 126, 127, 128, 129), and the upper wall 131, as well as the lower wall 132, so as to confine the fumes within the device interior or housing space 163, for ease of capture and withdrawal therefrom through the extraction tube 161.

The device 120 may be manually moved and positioned (such as, for example, to an initial starting position). To facilitate movement or positioning of the device manually, manual grips 171, 172 are provided. The manual grips 171, 172 are shown mounted on the housing 120 and positioned on the upper wall 131.

According to some alternate embodiments and implementations, the device 120 may be manually moved or driven over the substrate surface. For example, an operator may operate the device 120 to etch the substrate 110 over the substrate surface 110a or over a portion thereof. According to some implementations, the operator may guide the device 120 and manually actuate the laser 140 to etch a particular area. According to some other embodiments, the laser device 120 is programmed to identify its position on the substrate 110 or relative to the substrate surface 110a, and when the operator moves the device 120 to the appropriate location on the substrate 110, the device 120 actuates the laser head 140 to deliver the laser output to the substrate 110 to etch the area desired or designated with the markings or indicia (i.e., to produce the pattern).

Figure 4:
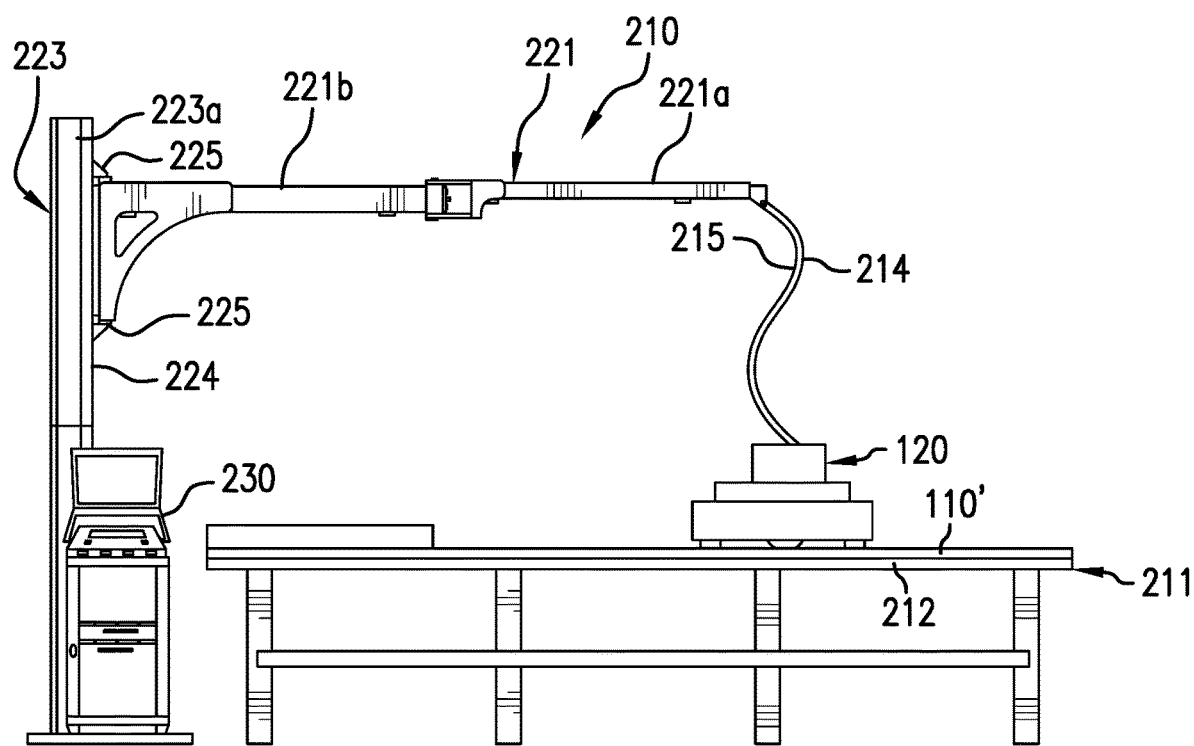
FIG. 4 is schematic illustration of a system, showing the device of FIG. 2, in an arrangement with a supporting table, frame and computing apparatus.

Referring to FIG. 4, an exemplary depiction of a system 210 for autonomous laser etching is shown. The system 210 has a supporting structure to support the substrate thereon. In the exemplary depiction, the supporting structure is depicted as the platform 211, which, according to some embodiments, may be an existing inspection table, as there are no chemicals to harm the structures. The substrate 110' is shown situated on the platform surface 212. A first line comprising an evacuation line 214 is shown, and connects with the extraction tube 161. The evacuation line 214 preferably provides a conduit for fumes that may be generated by the laser etching process to be drawn off, and delivered to an exhaust outlet (not shown) or for treatment so the fumes may be exhausted and filtered. According to embodiments, the filter may comprise suitable filtering mechanism that meets or exceeds regulations for handling, neutralizing and/or removing substances (e.g., gasses or fumes) that may be produced during the laser etching operation. A second line 215 comprising one or more of a data, power, or other electrical connection, is shown making a connection with the robot 120. The second line 215 may connect to a port, such as the upper port 180 of the device 120 (FIGS. 2 and 3), in order to provide communications in the form of signals to control the driving operations of the robot 120, and to control the laser operation. Although illustrated as separate lines, the first line 214 and second line 215 may be combined together, or with one or more other cabling or lines to effect conduits for gasses (extraction or admission), as well as to provide one or more channels for wiring, for data and electronics exchange capabilities for operating the robot 120 (e.g., the driving operations and functions of the laser).

The exemplary embodiment is shown having an arm 221 comprising a first section 221a pivotally connected to a second section 221b with a pivot fastener 222. The arm 221 preferably may include one or more channels for securing the lines 214, 215. Alternatively, or in addition, guides or bands may be provided on the exterior of the arm 221. The second arm section 221b is shown pivotally connected at one end to the first arm section 221a, and at another end to a supporting frame 223, and in particular to the frame post 223a. Fasteners 225 connect the second arm section 221b to the frame 223. According to some embodiments, the frame 223 may include a movable section 224 that is vertically movable along the frame post 223a. The fasteners 225 preferably may connect the second arm section 221b to the movable section 224. The movable section 224 may be raised or lowered as needed to position the arm 221 at a desired height. Similarly, the pivot operations of the first arm section 221a and second arm section 221b, as well as the second arm section 221b pivot with respect to the frame post 223, may be controlled with one or more motors (or other drives, such as cables or chains), to move the arms 221a, 221b left or right as desired. In some embodiments, the autonomous movement of the robot device 120 along the panel may be coordinated with the means for moving the arms 221a, 221b, as well as the movable section 224 of the frame (the means for example, being respective motors associated with respective pivot connections), so that each of the lines 214, 215 may be maintained at a desired position throughout the movement of the device 120.

A computer 230 is shown situated at the frame 223, and may be used to receive inputs from an operator for the etching operation. For example, the input may be a panel identification. The panel identification may comprise a part number, and entry of the part number may generate a menu of options for the etching, or, alternatively, the input of the part number may actuate a procedure that is pre-programmed to etch the part in accordance with a desired routine or protocol. The device 120 may carry out autonomous etching of the substrate (or portions thereof), in accordance with directions from the part identification selection or input. Alternatively, an operator may manually maneuver the device 120 over the substrate surface to carry out the etching.

Figure 6:
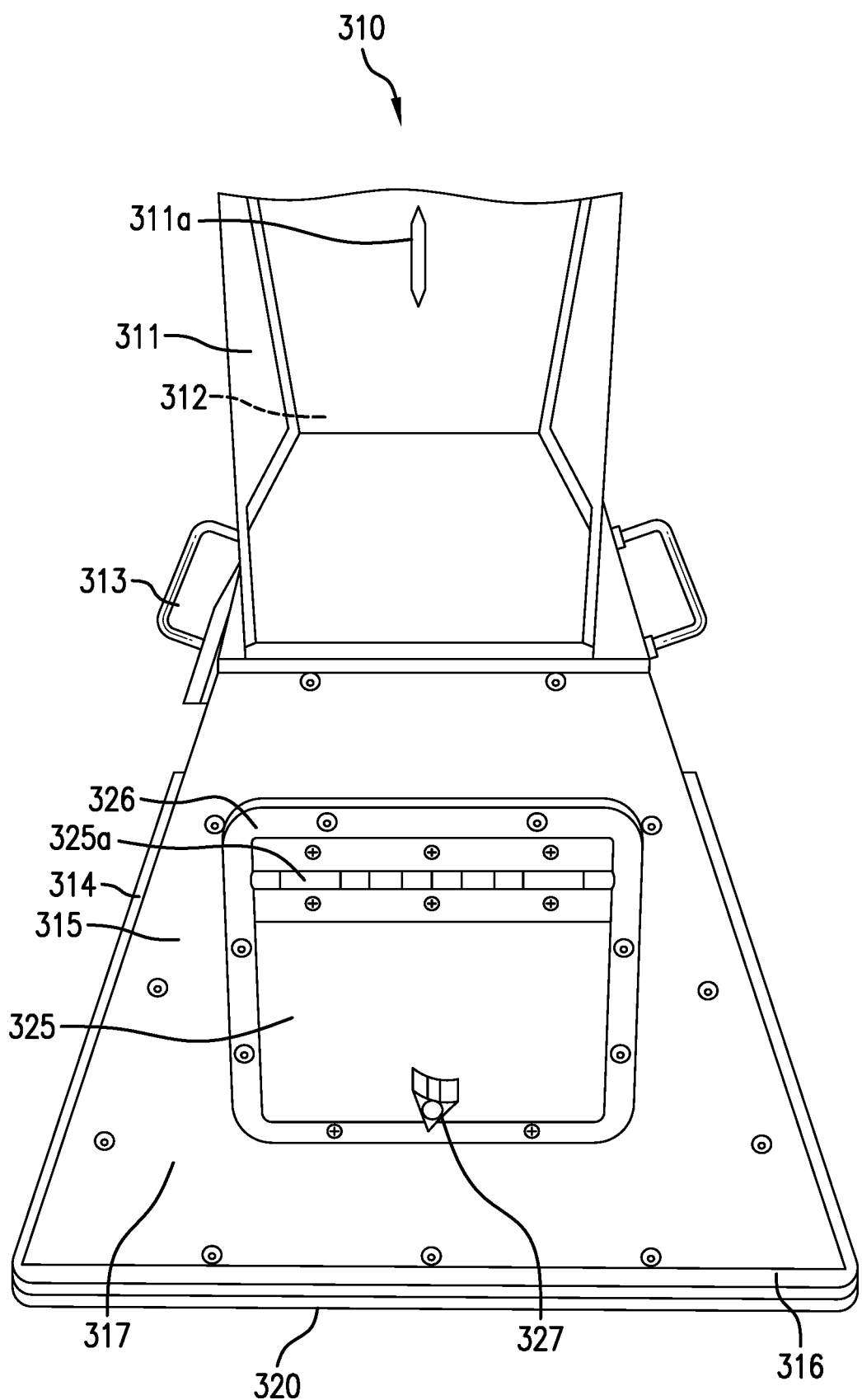
FIG. 6 is perspective view illustrating an exemplary manual laser etching hood with a laser mounted on top, a vacuum filtration system and laser interlock system.

The device 120 may be used manually, as an option. Referring to FIG. 6, an alternate embodiment of a manually operable laser etching device 310 is shown. For providing laser etching of indicia, such as a pattern (e.g., dots or other measurable shapes) on a metal or plastic substrate surface, in order that strain measurements may be determined. The device 310 includes a laser head 311 comprising a laser 312 that applies the pattern. The laser head 311 also preferably includes a laser indicator 311a, such as a diode, that lights or lights a particular color (e.g., green) to indicate when the laser 312 is on, i.e., is delivering an output. The laser head 311 is manually guided or directed over the substrate surface, preferably as part of the unit device 310. One or more handles 313 may be provided to facilitate moving and maneuvering the device 310 (the embodiment in FIG. 6 showing a pair of handles disposed on opposite sides of the device 310). The device 310 includes a housing 314 comprising a hood 315 with laser safety features to prevent the operator from access to the laser energy to a safe level, for both eye and skin. The device 310 depicted in FIG. 6 may be provided having a vacuum interlock. The vacuum interlock is a safety feature that permits a vacuum to be present via a vacuum line communicating with the interior of the housing 314. A rim 316 is shown provided at the edge of the lower end of the hood 315, and preferably defines a peripheral edge of the device 310 and is disposed at the device bottom, at the bottom of the hood 315.

According to preferred embodiments, the rim 316 includes a rim edge 320 comprised of a polytetrafluoroethylene (PTFE), or perfluoroalkoxy polymer resin (PFA), such materials being sold under the brand name Teflon® (The Chemours Company). As shown in FIG. 6, the rim edge 320 is provided to form a seal with the substrate surface and facilitate ease of sliding across the substrate surface, such as for example, a sheet metal surface. The slidable surface of the rim edge 320 is shown on the rim and may be integral with the rim 316. Preferably, the rim edge 320 is disposed about the bottom periphery of the hood 315 (surrounding the opening where the substrate surface is exposed to the laser so that the laser etching may take place).

Figure 8:
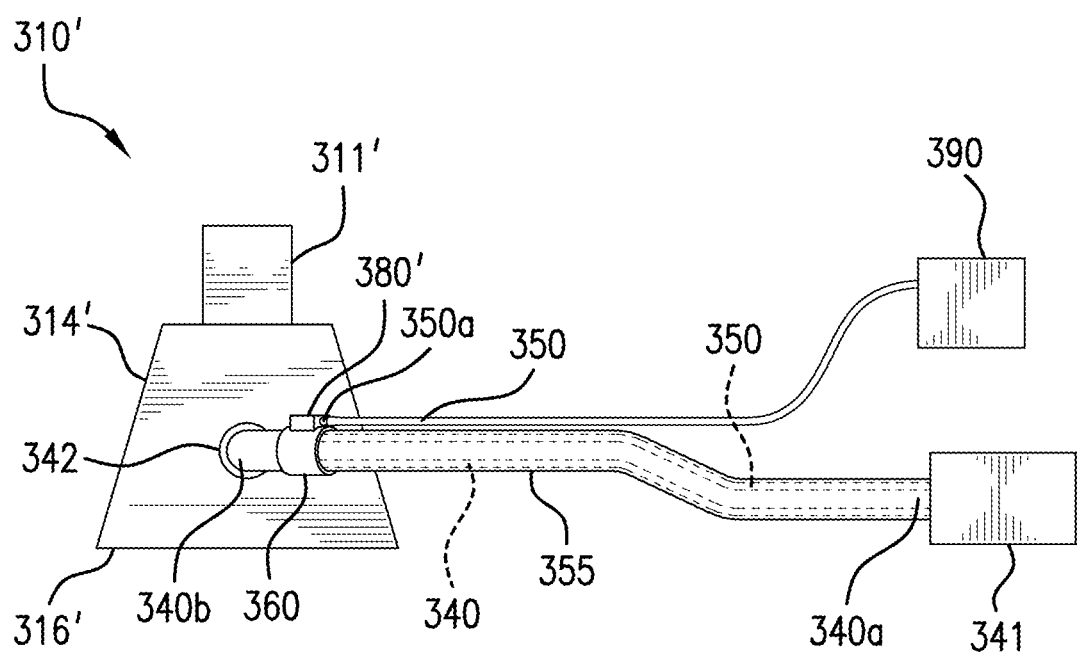
FIG. 8 is a schematic depiction of a laser etching device with a vacuum system and cabling.

The vacuum interlock is represented schematically in FIG. 8, which schematically depicts the device 310', having a housing 314' with a rim 316' and edge, and having a laser head 311'. The vacuum line 340 is shown having an end 340a connecting to a vacuum source 341, such as a pump or other vacuum producing mechanism, and connecting to a port 342 of the device 310' at its other end 340b. The port 342 preferably communicates with the interior of the housing 314'. The location of the port 342 may be provided at a suitable location on the device housing to draw off vapors and particles. At the port 342 or along the vacuum line is a filtration system, such as for example a HEPA filter 360, which filters particles from the vacuum stream. Electronic communications and/or power are made with the device 310, 310'. According to some embodiments, the device 310, 310' may itself have a separate or adjunct power supply (such as, for example, a battery, not shown). In FIG. 8, an electrical cable 350 is shown and may comprise cabling to supply power, communications from a computer 390, or both. Though shown separate, the vacuum line 340 and electrical and/or electronics cabling 350 may be provided in a single conduit (e.g., 355) that may house both the vacuum line 340 and electronic cabling 350. Alternatively, the vacuum line 340 and electronic cabling 350 may be provided in one or more lines or cables, respectively, if desired. The electrical or electronic cabling 350 may make a connection with the device circuitry via a connector 350a provided on the cable end, which may connect to a port 380' provided on the unit 310'.

The vacuum interlock system provides a safety feature for the device 310. When the vacuum lock is broken, a sensor senses the change in vacuum pressure, and stops the laser 312. Therefore, if one were to lift or move the laser head 311 or the device 310, and potentially expose the laser output to individuals or other nearby objects, the laser 312 is turned off to prevent it from creating damage (before the output would be directed to an unintended target). The laser hood 310 has an interior space which is bounded by the hood walls 317, and to which a vacuum line (see, reference 340, FIG. 8) is connected. A port on the hood 315 that communicates with the interior space is provided for the vacuum line to connect to. The device 310 preferably includes an engaging edge or rim that is disposed at the bottom of the device 310. The engaging edge or rim 316 contacts the substrate that is to be etched and on which the device is placed to effect a seal with the substrate surface that is sufficient to enable a suitable vacuum pressure to be maintained within the hood 315, and preferably, at least while the laser is being operated. The vacuum interlock includes a vacuum sensor that is configured so that when a vacuum is lost or reaches a suitable threshold, the laser is switched off (or otherwise blocked from transmitting).

The hood 315 is shown with a door panel 325 mounting to the housing wall 317 via a flange 326. The door panel 325 is hingably connected so that it may be lifted in the event an operator would need to check the interior or panel surface under the hood. A hinge 325a is shown. A latch shown comprising a knob 327 is shown, although any suitable closure may be used. According to an alternate embodiment, instead of the door panel 325 a window is provided and is sealably mounted. The window panel may be comprised of a transparent or semi-transparent material, and one that preferably will not permit passage of the laser output through the panel.

According to some embodiments, a light, such as a diode, is provided within the housing 315 to illuminate the interior of the housing for potential inspection (e.g., when the laser is not running).

Though not shown in FIG. 6, the laser hood device 310 preferably has a connecting wires that power the laser and/or provide electronic communications for the laser operations (e.g., from a computer), and a connecting line that connects with the laser hood and preferably the interior space of the laser hood, to draw a vacuum within the laser housing interior space. The communications cabling and vacuum lines or lines although separate may be provided in a single conduit or sheathing that connects with the device 310 at one end and connects with the computer and vacuum source (e.g., vacuum pump) at the other end. The vacuum interlock may be integral to the outer rim of the hood, which may be constructed from a polytetrafluoroethylene (PTFE), or perfluoroalkoxy polymer resin (PFA), such materials being sold under the brand name Teflon® (The Chemours Company). The outer rim 316 typically rests on the surface of the substrate being etched. The vacuum filtration system draws off harmful vapors and particulates. Preferred embodiments include an air filtration system to collect laser etching gases and particulates, and pass them through a HEPA filter, vent or similar removal method. The housing or hood space therefore contains the particulates and vapors so that they may be withdrawn via the vacuum filtration system, thereby improving operator safety, as well as a quality of the etching. The vacuum interlock enables the vacuum to be maintained when the laser is operating and when the hood is in engagement with the surface, and a vacuum sensor is electronically coupled to switch the laser off when the vacuum in broken or pressure increases. FIG. 8 is a schematic depiction of the vacuum and cabling that may be applied in connection with the device 310 shown in FIG. 6.

Figure 7:
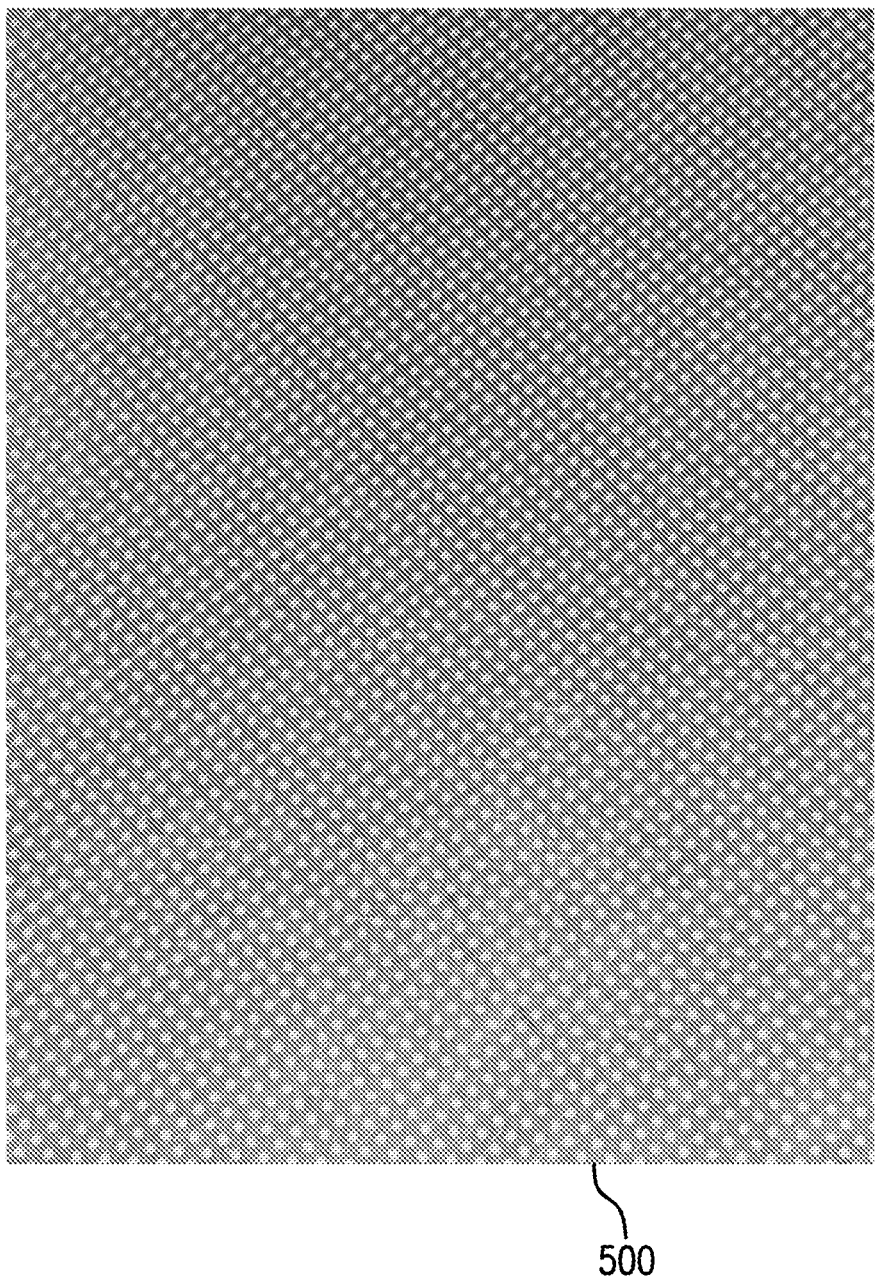
FIG. 7 is an example of a typical laser etched dot pattern on an automotive sheet metal panel used by the ARGUS Photogrammetry system to measure for feedback calibration to the laser and for precision formability measurement.

Referring to FIG. 7, an exemplary depiction of a pattern for conducting formability and strain measurements is shown according to an exemplary embodiment. The pattern shown in FIG. 7 represents a typical laser etched dot pattern on an automotive sheet metal panel 500 that may be used by the ARGUS Photogrammetry system to measure for feedback calibration to the laser and for precision formability measurement.

According to a preferred implementation, a method for conducting a formability study is provided. The method involves the selection of a substrate that is desired to be studied with respect to formability when the substrate undergoes a change. One example, is a panel that is used to form product or portion of a product. The panel, for example, may be manipulated to a desired shape or configuration. As one example, the method may be used to conduct formability evaluations of a panel, such as, for example, the panel 110 (FIG. 1). The panel is first prepared by cleaning the surface so that the surface is free of any interfering debris that may otherwise interfere with the etching procedures. The substrate, such as the panel, is selected based on its use. The panel is placed on a surface, such as a table. The areas of the panel, or the entire panel is designated to receive a pattern thereon. A laser etching device, such as the device 120, is positioned on the substrate, such as a panel. In this example, the panel is a steel sheet, which is to be used in the construction of an automobile. The system involves positioning the components at locations to produce the etching. According to an arrangement, a means for holding the panel, such as a platform or table having a surface is provided to receive the substrate or panel thereon. The panel is supported on the table (211, FIG. 4). Although according to preferred embodiments, a large panel inspection table may be used, according to other embodiments, the panel may be placed on the floor. The system, preferably the robot 120 and its etching head 140, aligns itself with the panel's edges and knowing the CAD, etches the dot pattern across the entire sheet of metal.

According to embodiments where the laser etching device includes connections to one or more wires or conduits, such as an exhaust line, or other cabling, the system preferably includes a supporting structure, such as a boom arm (see 221, FIG. 4) that is positionable or movable to move and or maintain connections to the device as the method is being carried out.

The method commences with the set-up of the laser etching device 120. The laser etching device 120 is programmed with instructions to etch the pattern of indicia. The programming may be remote from the device 120, for example, by a separate computer, making a wired or wireless connection with the device 120 to control the device and laser operations, including, for example, the positioning (and movement) of the device 120 and delivery of the laser output to the panel. The set-up of the system may begin with a zero-bump stop. Loading and then referencing this corner will allow the operator to program panels from the same start point each time. This will make it easy to etch the entire panel, or identified hot spots. An x, y, z gantry system will be programmed to automatically move the laser head to the areas of interest (or if manually operated, identify when the laser is moved to a desired area of interest that is to receive etching).

The method and system also may operate in a Kiosk Mode, which allows for minimal upfront programming to be done. For example, according to some implementations, once the first set of programming is done for each panel, repeatability may be achieved for other panels with just a push of a button (actuation of the program).

According to a preferred embodiment, the workflow to produce etching on the panel with the autonomous laser device and system, may be accomplished with the following steps:

1. Place sheet metal panel onto table;
2. Bump stop the zero edge;
3. Choose part number, which loads material type and part;
4. Choose whole part, or circle specific areas, to be gridded;
5. Press start button;
6. Operator can then proceed to other job duties while etching is occurring;
7. Laser head will etch the desired areas;
8. Once finished, panel can be given to the press operation for stamping.

Figure 5:
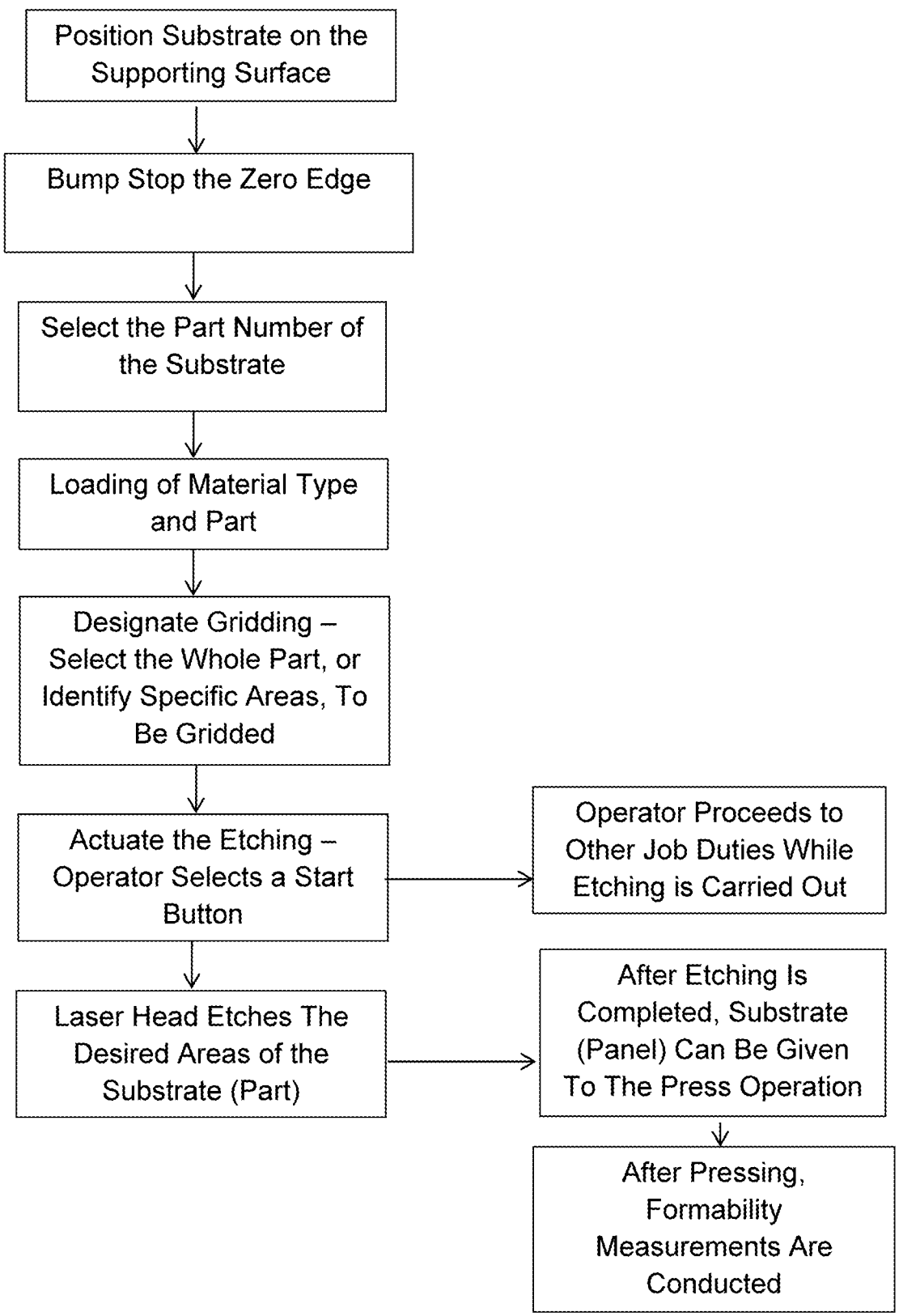
FIG. 5 is a flow diagram illustrating an exemplary depiction of the method for carrying out autonomous marking of a substrate and conducting formability measurements.

Referring to FIG. 5, a flow diagram of an exemplary depiction for carrying out the method for autonomous etching of a substrate, which may be a part of a structure, such as a vehicle panel, or other item, is taken through the steps. The method preferably is carried out in conjunction with the devices and systems disclosed herein, including, for example, the robot etching device 120, and the systems disclosed and depicted in FIGS. 2-4. A computer may be operated to store information or to access information about the part and/or etching operations. That information may be local or stored on a remote computer or server, and is accessed by the local computer (or the device itself), through a suitable network or communications link (e.g., Wi-Fi, wired, short-wavelength UHF radio waves, such as Bluetooth®, or cellular, or the like). The part information may be used to assist the device in carrying out etching at the proper or desired locations on a substrate (part).

According to some embodiments, the placement of the device on the substrate surface, such as a panel, may be carried out by positioning the device at an edge or known location of the panel. The bump stop may be used to identify the location of the device, and the computer may record the location relative to the CAD coordinates for the part. In this implementation, the part may be etched in its entirety or at discrete designated locations, and the device may be operated autonomously to etch indicia (such as a dot pattern, for example) on the panel surface at locations coordinated with the CAD file. CAD file coordinates for the panel or part may be used to direct the etching and device operations. For example, the device movement and positioning may be carried out autonomously with user selections, or may be designated for one or more panel types or material types.

In the above example, the panel has a designated part number and is part of an assembly. The operations may be guides or controlled by a remotely situated computer (such as the computer 230 shown in FIG. 4), or according to some alternate embodiments, may be provided as part of the device itself. Combinations of these also are possible, with some operations being programmed in circuitry of the device and other operations being programmed with a remote computer that communicates with the device. The device, even where remotely programmed, may still communicate the programing to a remotely situated computer. Alternatively, the device may be configured to wirelessly communicate with a computer or server for exchange of information, such as part data for a substrate to be etched. The computer or server may be local, or may be remote and reached through a network connection made by the device or a local computer or communication component.

According to some embodiments the device 120 may be configured with circuitry that may include one or more processing components, such as a hardware processor, controller, microcontroller, as well as software containing instructions for controlling the operations of the device, such as, for example, the positioning and driving operations of the wheels, the positioning and output of the laser, which may include positioning the device and/or laser according to an x, y, z, gantry arrangement to deliver the etching to the desired location on the substrate, e.g., panel. The programming may be done via a menu that may interface with or be provided directly as part of a screen of the device 120. Alternatively, according to some embodiments, the device 120 may be programmed using a remote computer, which may be associated with a remote display where an operator may input the desired parameters for the etching pattern that is to be applied. The parameters may be stored in a database where a part number or other identifiers are associated with the desired pattern. This allows for subsequent implementation of the patterning with the device, by identifying the part number. For example, the information may identify that only certain areas of the substrate (panel) are to be etched, while in other cases, for other parts, the information may indicate that the entire panel is to be etched with the pattern.

The system, method and device provide a turn-key laser etching robot, which according to preferred embodiments, includes:

1. Mobile operation, use on any inspection table, movable to needed area;
2. Autonomous robot operation, for any size blank, set and forget operation;
3. Precision multi-axis drive motors for precision movement on blanks;
4. Standard 120 VAC operation anywhere;
5. Proprietary boot style CDRH certified laser guard;
6. Fume air extraction system;
7. Engineering & Design for all, mechanical, electrical, and machine controls.

In addition, the system, methods and devices may be installed at a location, and with minimal training, allow operators to carry out the etching operations.

Once the dot pattern applied to the panel, the panel may undergo subsequent steps which include manipulations. These manipulations, for example, may include stampings, where a door panel of a vehicle may be stamped from the panel. For example, the panel may be stamped with a die or other tooling that provides cutouts for a door handle, and/or for a window, or that produces a bend in the panel to form one or more curved surfaces of the door. When these manipulations are carried out on the marked panel (i.e., the panel that has the indicia pattern thereon, such as the dot pattern), the dots will be elongated in certain areas where movement of the panel has taken place. The elongations of the dots, including the extent thereof, and direction, provide meaningful information to evaluate the formability, such as strain, that the stamped panel has undergone.

Once the panel has undergone etching with the methods, system and devices, formability measurements, such as ARGUS formability measurements may be carried out. For example, a forming analysis system, such as, for example, ARGUS (GOM GmbH, Braunschweig, Germany) may be used to provide full-field results with high local resolution for small as well as for large components, such as, for example substrates that have been etched with the autonomous etching device, system and methods (or with the alternative manual etching using the device). An analysis and evaluation of the panel, once subjected to the stamping process (or other manipulations or loads), may be undertaken for detection of critical deformation areas, which may assist in solving complex forming problems. The panel dot pattern also may be used to gain information to optimize the forming processes, as well as verification of tools used in the process to form the panel (e.g., stamping tools and dies), as well as verification and optimization of numerical simulations. The system, method and devices facilitate reduction of time along with the elimination of chemicals to provide an etched panel that includes a pattern that may be evaluated using evaluations methods, systems and software.

The etched pattern further may be used to facilitate measurement of full-field results for the verification of numerical forming simulations. For example, panels that have been processed with the autonomous laser etching devices, systems and methods, shown and described herein, generate a pattern of indicia, such as a dot pattern that may be used in conjunction with the ARGUS system to generate results that include full-field information about: 3D coordinates of a component's surface, Form change (major and minor strain, thickness reduction), Forming Limit Diagram (FLD) and sheet metal hardening. A commercially available system, such as the ARGUS system, may be used in conjunction with substrates that have been etched with indicia thereon according to the etching system and devices to provide measuring that operates independent of the material. The patterned substrates produced by the devices, system and methods herein, may be analyzed with the ARGUS application.

Once a pattern has been etched, the substrate specimen is recorded by means of high-resolution images. The initial imaging recording may serve as a baseline for subsequent measurements (which may be taken after the substrate is subjected to one or more processing steps (i.e., deformations). These images are evaluated with a suitable software processing program, such as for example, ARGUS software. For example, according to some applications, from 3D coordinates of the object points of the substrate, the actual results of the forming and the sheet metal thickness may be calculated taking into account the geometry of the substrate and following the rules of the plasticity theory. For example, according to an application where the ARGUS software is implemented, the form changes are displayed in a false-color 3D mesh. Labels may facilitate representation of special points on the surface with their respective measuring values.

Although ARGUS is mentioned as one example of a commercially available formability analytic application, other applications may be used in conjunction with the present system, method and devices to generate information from the patterned substrates.

The method, system and device may be used to conduct autonomous etching of the panel. The results of this autonomous etching method will produce an accurately placed perfect dot pattern, for the entire panel, or for specific areas of concern. This pattern will have the proper contrast and is material independent, without the use of chemicals. Once the panel is etched, it may be subjected to one or more processing steps, where it is manipulated, such as, for example, in a stamping operation. The panel dot pattern is then deformed along with the panel deformation, and the changes in the dot pattern may be evaluated (preferably with analytical software, including commercially available formability analysis software, such as ARGUS), to determine strain and stresses.

According to other embodiments, the laser robot 120 may include a computer with processing capabilities so that it may be programmed to produce a pattern when set on the substrate. One or more sensors may be provided to safeguard the device 120 from potential movement off of the substrate surface. The device 120 may include a bump stop sensor so that when the device 120 is positioned on the panel, the sensor will note the location. A computer file containing information about the part, such as the part location coordinates, may be used to guide the device 120 to locations on the substrate surface.

In addition, the system may include a library of parts and part reference data, which may provide the device with guidance for etching a particular pattern for particular parts, or to provide an operator with a menu selection for example, to select a pattern to be etched on the part, or on a portion of the part. The library may include the CAD drawing of the part and may integrate with the device to generate patterns at one or more locations on the part. The system carries out autonomous marking of the panels, and once the device is situated on the panel (which may be done by an operator, or by another device or robot that places the device on the panel), the device is operated to produce etching indicia on the substrate (such as a panel) or one or more portions of the substrate. The device may be configured to operate in connection with an associated CAD file using the CAD file coordinates to determine the device position, including the device initial position, and positions of the device on the panel surface. A computer may be programmed with instructions to determine and/or actuate the device laser (or allow it to be actuated in the case of a manual operation), which instructions are transmitted to the device circuitry to provide laser etching at the desired location or locations on the substrate.

The laser etching applied using the lasers shown and described herein, may include the application of one or more codes. The laser output etches the desired indicia on the substrate surface or surface portion including a code or codes. The desired indicia etched onto a substrate such as an automobile panel, may comprises a pattern of random dots, a code or preferably both. The code or codes may include unique QR codes to locate where on the structure the data is being taken. An image of the etched pattern may be captured and stored to provide a baseline. A baseline comparison of the image (i.e., historical image data) with the subsequent image, such as the image of the pattern and codes may be carried out to determine deformation by evaluating changes in the etched indicia.

The methods may be carried out for testing of a structure or substrate before it is assembled or placed into service or use, or may be applied to a structure or part thereof for determining in-service deformations. A change in the substrate or substrate portion may be determined by identifying deformation of the dot pattern, as well as the QR code, which may be used for alignment determinations to correlate imaging data, as well as for strain deformation measurements at the etched location of the code. The methods, system and devices, also may be used to carry out formability evaluations of panels that are used for consumer appliances, as well as beverage containers, and other articles.

While the invention has been described with reference to specific embodiments, the description is illustrative and is not to be construed as limiting the scope of the invention. Various modifications and changes may occur to those skilled in the art without departing from the spirit and scope of the invention described herein and as defined by the appended claims.

What is claimed is:

1. A method for marking of a substrate via laser etching, comprising:

a) providing a substrate having at least one surface;

b) designating a surface or surface portion of said at least one surface to receive marking of desired indicia;
c) supporting the substrate on a supporting structure;
d) positioning a laser etching device on the substrate;
e) actuating the laser etching device to deliver a laser output that laser etches the desired indicia on the substrate surface or surface portion; and
f) wherein said indicia comprises a dot pattern, wherein the substrate or substrate portion with the laser etched pattern is manipulated, and imaging the substrate or substrate portion, and determining a change in the substrate or substrate portion by identifying deformation of the dot pattern.

2. The method of claim 1, wherein actuating the laser etching device to deliver the laser output that laser etches the desired indicia on the substrate surface or surface portion includes moving the laser etching device or portion thereof across the substrate surface to laser etch the desired indicia on the substrate surface.

3. The method of claim 1, including programming operating software with a desired indicia to be etched onto the substrate surface or surface portion, and wherein the laser etching device is operated in conjunction with instructions from said operating software.

4. The method of claim 2, including programming operating software with a desired indicia to be etched onto the substrate surface or surface portion, wherein said software includes instructions to operate the movement of said laser etching device to produce the desired indicia on the substrate surface.

5. A method for marking of a substrate via laser etching, comprising:
a) providing a substrate having at least one surface;
b) designating a surface or surface portion of said at least one surface to receive marking of desired indicia;
c) supporting the substrate on a supporting structure;
d) positioning a laser etching device on the substrate;
e) actuating the laser etching device to deliver a laser output that laser etches the desired indicia on the substrate surface or surface portion;
f) wherein actuating the laser etching device to deliver the laser output that laser etches the desired indicia on the substrate surface or surface portion includes moving the laser etching device or portion thereof across the substrate surface to laser etch the desired indicia on the substrate surface;
g) including programming operating software with a desired indicia to be etched onto the substrate surface or surface portion, wherein said software includes instructions to operate the movement of said laser etching device to produce the desired indicia on the substrate surface; and
h) wherein the laser etching device is manually moved across the surface to etch each area, and wherein said laser etching device includes safety protection comprising a vacuum interlock.

6. The method of claim 4, wherein the laser etching device is autonomously operated to laser etch the desired indicia on the substrate surface.

7. The method of claim 1, wherein the substrate is comprised of metal.

8. The method of claim 1, wherein said laser etching device has a transport mechanism for moving and positioning the laser at locations along the substrate surface, and wherein said laser etching device is moved to one or more designated locations to produce laser etching at the desired one or more locations.

9. The method of claim 1, wherein said laser etching device is actuated to move along an x, y, z coordinate system relative to the substrate surface.

10. The method of claim 9, wherein said laser etching device comprises a gantry system.

11. The method of claim 10, wherein said marking comprises a pattern of dots, and wherein said laser etching device moves to locations of the substrate and applies the etching to the substrate surface to produce the pattern.

12. The method of claim 1, including capturing fumes with the device and exhausting the captured fumes from the laser or other device.

13. The method of claim 1, wherein a computer is operably connected to communicate with the laser etching device, and wherein said computer provides instructions for actuating the laser etching device, including movements of the laser etching device and delivery of the laser output.

14. The method of claim 1, wherein the substrate or substrate portion with the laser etched pattern is manipulated, wherein the substrate or substrate portion comprises a panel, and evaluating the pattern after the panel has been manipulated to evaluate one or more strain properties.

15. The method of claim 14, wherein said manipulation comprises stamping the panel with one or more stamping tools or dies.

16. The method of claim 1, including designating a surface or surface portion of said at least one surface to receive marking; wherein the laser etching device is associated with a computer and software containing instructions for operating the device to mark the substrate or surface portion thereof, and wherein upon receiving an input, the laser etching device operates to move across the panel and etch indicia on the substrate surface or surface portion.

17. The method of claim 16, wherein the instructions that instruct the laser etching device operations to mark a surface or surface portion are associated with the identification of the substrate.

18. The method of claim 17, wherein the identification is a part number.

19. The method of claim 1, wherein the desired indicia comprises a pattern usable for conducting DIC, and includes one or more codes, and wherein actuating the laser etching device to deliver a laser output that laser etches the desired indicia on the substrate surface or surface portion includes etching one or more codes on the substrate surface or surface portion along with the pattern.

20. The method of claim 1, wherein the desired indicia comprises one or more of a pattern of random dots and one or more codes, wherein said one or more codes include unique QR codes to locate where on the structure the data is being taken.

21. The method of claim 20, including making a baseline comparison of an image of the substrate surface or surface portion by recalling stored historical data of the substrate surface or surface portion and conducting comparison of said image of said pattern.

22. A method for marking of a substrate via laser etching, comprising:
a) providing a substrate having at least one surface;
b) designating a surface or surface portion of said at least one surface to receive marking of desired indicia;
c) supporting the substrate on a supporting structure;
d) positioning a laser etching device on the substrate; and
e) actuating the laser etching device to deliver a laser output that laser etches the desired indicia on the substrate surface or surface portion;

f) wherein the desired indicia comprises a pattern usable for conducting DIC, and includes one or more codes, and wherein actuating the laser etching device to deliver a laser output that laser etches the desired indicia on the substrate surface or surface portion includes etching one or more codes on the substrate surface or surface portion along with the pattern; and g) wherein the substrate or substrate portion comprises a panel, wherein the substrate or substrate portion with the laser etched pattern is manipulated, and evaluating the pattern after the panel has been manipulated to evaluate one or more strain properties.

23. The method of claim 1, wherein the desired indicia includes at least one code, and wherein said code identifies a start point for conducting imaging.

24. The method of claim 23, wherein said code comprises a QR code, and wherein said QR code includes information about the substrate or substrate portion.

* * * * *